Patented Aug. 2, 1932

1,870,023

UNITED STATES PATENT OFFICE

GEORGE W. RAIZISS AND LE ROY W. CLEMENCE, OF PHILADELPHIA, PENNSYLVANIA, ASSIGNORS TO ABBOTT LABORATORIES, OF NORTH CHICAGO, ILLINOIS, A CORPORATION OF ILLINOIS

IODIZED OILS FOR ROENTGENOGRAPHIC WORK

Application filed June 7, 1928. Serial No. 283,732.

The objects of the invention are to provide oils containing an element, for example, iodine, which is opaque to Roentgen rays, but without other undesirable characteristics, so that said oil may be used successfully for Roentgenographic work, and to provide an improved process for producing such oils.

We have discovered that certain vegetable oils belonging to the group of so-called non-drying oils may be combined with iodine so as to produce iodized oils which are opaque to Roentgen rays and are, therefore, suitable for Roentgenographic studies.

As examples of oils which have been found suitable for this purpose may be mentioned rape oil, rapeseed oil, Colza oil, and generally the family of oils resulting from the use of the seeds belonging to the family of Cruciferæ, namely, *Brassica napus*, *Brassica campestris* and *Brassica rapa*. All of these oils are non-drying and are capable of taking up a large percentage of iodine. Iodo compounds in which iodine is firmly attached to the carbon, are formed with the above described oils due to the absorption of iodine by the unsaturated fatty acid esters present in said oils.

The rape oil group particularly gives iodized oils which are very stable, give excellent shadows in Roentgenographic work and in addition thereto are of very low toxicity permitting safe administration of these products to patients.

In order to induce successful iodization by these oils, solutions of the oil and iodine are allowed to interact at ordinary room temperature by the aid of a catalyst, for example mercuric chloride. As solvents for the oil and iodine either chloroform or ether may be used. For the removal of all traces of free iodine from the finished product aqueous solutions of potassium iodide are employed and the finished product is purified by the use of a fine grade of charcoal, preferably nuchar.

Example 1

A solution of 100 grams of iodine in 1000 cc. of ethyl alcohol is mixed with a solution of 120 grams of mercuric chloride in 1000 cc. of ethyl alcohol and the whole added in a very slow stream to 100 grams of rapeseed oil dissolved in 600 cc. of chloroform. (Rapeseed oil is composed of the glycerides of stearic, erucic and oleic acids. Its specific gravity is about 0.914; the saponification value ranges from 167 to 178, and the iodine value from 93.5 to 105.6.) The resulting reaction mixture, which contains an excess of iodine, is permitted to stand for about 6 hours and then vigorously mixed with 5 gallons of distilled water for a short time (some minutes). At the end of this time the chloroform solution of the final product separates from the aqueous solution containing the excess iodine and other ingredients; the aqueous layer is siphoned off and the remaining chloroform solution first freed of precipitated mercuric iodide by filtration and then washed with 1% potassium iodide solution until it becomes almost colorless, thereby indicating that the last traces of free iodine have been removed.

The chloroform solution is then washed with water until free of potassium iodide, and finally rendered free of all traces of adherent water by the addition of anhydrous sodium sulphate. After filtering off the latter the chloroform solution is further purified by the introduction of nuchar (a pure grade of charcoal), filtered again and most of the chloroform removed from the filtrate by vacuum distillation. From the residue the last traces of chloroform are eliminated by warming on a water bath at ordinary atmospheric pressure.

The above described method yielded a preparation of iodized oil, the specific gravity of which ranged from 1.2 to 1.3. The resulting product represents a light yellow transparent oil, possessing a faint aromatic odor. This iodized oil is a stable product if preserved in a cool place in amber glass. It is easily soluble in chloroform, ether, benzene and carbon disulfide. It is insoluble in water and alcohol. The oil has a faintly slight acid reaction. It is practically of neutral reaction. It is a firm combination of rapeseed oil with iodine, free of inorganic iodides. The iodine is liberated from the oil by treatment with concentrated sulphuric acid. Upon heating of the iodized oil with concentrated sulphuric acid, vapors of iodine can be seen.

*Another general method*

The second procedure for the preparation of the iodized oil is substantially the same as the one described above, except that the chloroform and alcohol were substituted by ether. The volume of ether necessary was one and one-half times that of the chloroform and alcohol, but on the other hand, the quantity of iodine used we made considerably less, so that only a slight excess was employed. This is of considerable advantage, as it entailed the use of much smaller quantities of potassium iodide in removing the slight excess of halogen. Furthermore, ether is more readily removed by distillation, as its boiling point is lower than that of chloroform.

*Example 2*

A solution of 75 grams of iodine in 1500 cc. of ether is mixed with solution of 120 grams of mercuric chloride in 1500 cc. of ether and the whole added in a very slow stream to 100 grams of rapeseed oil dissolved in 900 cc. of ether. The mixture of iodine and mercuric chloride are added to rapeseed oil only until a slight coloration persists, indicating that no more iodine is absorbed and only a small excess of iodine is added. The resulting reaction mixture which contains only a very slight excess of iodine is permitted to stand for one hour and then vigorously mixed with 5 gallons of distilled water for a short time. At the end of this time the ether solution of the final product separates from the aqueous solution containing a small amount of excess iodine and other ingredients.

The aqueous layer is siphoned off and the remaining ether solution first freed of precipitated mercuric iodide by filtration and then washed with small quantities of 1% potassium iodide solution until it becomes almost colorless, thereby indicating that the last traces of free iodine have been removed. The ether solution is then washed with water until free of potassium iodide and finally rendered free of all traces of adherent water by the addition of anhydrous sodium sulphate. After filtering off the latter, the ether solution is further purified by the introduction of nuchar, filtered again and most of the ether removed from the filtrate by distilling it on a water bath. From the residue the last traces of ether are eliminated by gentle warming on a water bath.

The examples given are illustrative of merely preferred applications of our invention, the scope of which is to be determined by reference to the appended claims, said claims to be construed as broadly as possible, consistent with the state of the art.

We claim as our invention:

1. As a new medicinal agent, a non-drying oil of the rape family combined with iodine.
2. As a new composition of matter, an oil of the family Brassica chemically combined with iodine.
3. As a new composition of matter, rape oil chemically combined with iodine.
4. As a new composition of matter Colza oil chemically combined with iodine.

GEORGE W. RAIZISS.
LE ROY W. CLEMENCE.